UNITED STATES PATENT OFFICE.

THOMAS B. STILLMAN, OF HOBOKEN, NEW JERSEY.

PROCESS OF EXTRACTING POTASSIUM COMPOUNDS FROM SILICIOUS MINERALS.

1,106,984.

Specification of Letters Patent.

Patented Aug. 11, 1914.

No Drawing.

Application filed March 29, 1913. Serial No. 757,575.

*To all whom it may concern:*

Be it known that I, THOMAS B. STILLMAN, of Hoboken, county of Hudson, and State of New Jersey, have invented certain new and useful Improvements in Processes of Extracting Potassium Compounds from Silicious Minerals, of which the following is a full specification.

My invention relates, as recited, to processes for extracting potassium compounds from silicious minerals, and consists in the hereinafter set forth and claimed improvements in such processes, having the object in view to obtain the potassium, contained in such minerals, by a process devised to be carried on profitably on a commercial scale; that is, in a way, in which sufficiently large quantities of such minerals may be worked in a continuous run, and by which to obtain, as the ultimate product, potassium compounds, available for use in the industries and for other purposes, and at a sufficiently low cost, to enable the product of the process to be sold at a profit in competition with the commercially salable potassium compounds, mined in the countries, where natural deposits of such compounds are found.

A further object of my invention is to obtain desirable and readily utilizable by-products, without increasing the cost and commercial feasibility of the process.

The reason that the potassium bearing minerals, which are found in abundant quanities in many parts of this country, have not yet been commercially exploited for obtaining the potash or potassium contained therein, is the fact that the attempts, made to carry on, on a practical scale, the processes, described in text books, or in Letters Patent, and in other literature relating to the art, fail to produce the economically desirable product, or at such a cost as it must be produced to meet the requirements of the conditions. It is mostly the cost of carrying on such a process, and, in some instances, also the undesirable character, either commercially or chemically, of the ultimate residue, or the by-products, which are fatal to any attempt of commercial utilization of any of the processes heretofore known.

An economical and commercially feasible process of extracting potassium from silicious minerals, such as feld-spar, and other minerals, containing a workable proportion of it, may be carried on according to my invention as follows: The silicious mineral is ground, not necessarily pulverized, or converted into its amorphous state, and then, as heretofore proposed, thoroughly mixed with carbonate of potash ($K_2CO_3$), or of soda ($Na_2CO_3$). Though carbonate of soda is cheaper, and though a smaller proportionate quantity of it is required, the use of carbonate of potash is preferable for carrying on the process commercially. Carbonate of potash is a more active chemical agent, melts at a lower temperature, and the processes of separating the products of the successive reactions are simpler and less expensive. Its employment in the process has the further advantage that by proceeding, as hereinafter set forth, the potash of the carbonate thus employed, together with the potash, contained in the silicious mineral, is recovered again in a compound, carbonate of potash, commercially much more valuable than the ultimate product of the process, when carbonate of soda is used.

The proportion of the carbonate of potash, or soda, to be mixed with the pulverized silicious mineral, depends upon the proportionate quantity of silica and alumina contained therein; it is preferable to use more of it than sufficient to convert all of the silica of the mineral into potassium silicate and all of the alumina into potassium aluminate, as thereby a more complete or exhaustive extraction is secured. The excess of the carbonate should, however, be small; a large excess is not only a useless addition to the costs of the process, but also in other respects detrimental to carrying on the process on a commercial scale. Taking, for example, one ton of potash-bearing feldspar, orthoclase, containing 60–66% silica, and 12–20% of lumina, not less than 2,872 lbs. of carbonate of potash, should be used, and not more than 3,000 lbs. to obtain the best working proportions in carrying on the process.

The mixture of the mineral with the carbonate of potash is melted at a high temperature. For this I found a Rockwell furnace of the reverberatory form, employing oil as fuel and an air blast, to be most effective and most economical of any apparatus tried. During the melting of the mixture, the silicious mineral and the carbonate of potash are decomposed, the carbonic acid of the carbonate is expelled, the caustic potash combines with the silica and the alumina of the mineral, forming silicate of potash ($K_2SiO_3$) and aluminate of potash ($KAlO_2$). There will be formed also some oxid of potash ($K_2O$) from the excess of the carbonate employed, and the presence, and the quantity, of this oxid of potash may be considered as a determining test, whether the right proportion of the carbonate was used. Considering now, that a sufficient quantity of carbonate of potash was employed to so decompose the potash-bearing mineral in the first step of the process, the products of this decomposition will be: (1) Potassium silicate ($K_2SiO_3$); (2) aluminate of potash ($KAlO_2$) and (3) a small quantity of potassium oxid ($K_2O$). The aluminate of potash and the oxid of potash are readily soluble in cold water, whereas the potassium silicate is not, and if the fused mixture is pulverized and then treated with just enough cold water (about 1,000 lbs. of water per ton of mineral) the aluminate of potash, and the oxid of potash are dissolved, whereas the potassium silicate, being also considerably heavier, will sink to the bottom of the vessel and remain as residue after the solution of the aluminate and oxid of potash is withdrawn. To this solution just enough ammonia (about ten pounds of ammonium hydrate per ton of material treated) is added, to render the solution safely alkaline, and then for each ton of the material treated about 110 pounds of ammonium chlorid, dissolved in about an equal quantity of water. Thereby the alumina of the aluminate of potash is precipitated as hydrated aluminum oxid, from which the remaining solution may be separated by filtration, or by a mechanical separator. The liquor, from which the precipitate was thus separated, contains the potassium oxid in solution, and a small amount of ammonia. By charging this liquor with carbonic acid gas ($CO_2$) about 212 lbs. of it being required per ton of mineral treated, the oxid of potassium, contained therein, is converted into carbonate of potash, and the carbonate of potash is recovered, in its amorphous state, by evaporating the water. The hydrated aluminum oxid, obtained as the residue of the filtration, or of the mechanical separation, may then be washed and dried, whereby the water is eliminated and the aluminum oxid obtained in dry state, or it may be dissolved in diluted sulfuric acid, and the water evaporated, whereby aluminum sulfate is obtained in dry state, or crystallized as $Al_2(SO_4)_3 + 18H_2O$. The better way, however, is to treat the aluminum oxid with sulfuric acid ($H_2SO_4$) of 1.84 specific gravity, about 429 lbs. of it being required per ton of the mineral treated, whereby the aluminum oxid is converted into aluminum sulfate, $Al_2(SO_4)_3$, which is then crystallized by evaporation, producing $Al_2(SO_4)_3 + 18H_2O$. By this process the evaporating of all of the water, used to dilute the sulfuric acid, approximately 2,150 lbs. per ton of mineral treated, is saved. The potassium silicate, remaining as residue in the first step of the process, is dissolved in boiling water, about 5,000 lbs. of the water being required per ton of the silicious mineral treated, and saturated with carbonic acid gas ($CO_2$) of which about 951 lbs. per ton of mineral is required, producing insoluble silica, and, substantially all of the potash, originally combined with the silica in the first step of the process, is obtained as carbonate of potash in solution.

The separation of the silica from the solution of the carbonate of potash is most rapidly and effectively accomplished in a mechanical separator, the De Laval separator being well suitable for handling it effectively in such quantities as the conduct of the process on a commercial scale requires. Some of the carbonate of potash will remain with the separated silica. To save it, the separated silica is washed with fresh water, and the liquor, drained off in the washing, is added to the solution of carbonate of potash, remaining after the hereinbefore related elimination of the alumina from the solution of oxid, and of aluminate, of potash, obtained in the second step of the process. By evaporating the water, the carbonate of potash is obtained in crystalline form, substantially pure, except for a trace of carbonate of ammonia.

Calculating the average results of this process, there are recovered as the ultimate products per ton of the silicious mineral (common potash-bearing feldspar) treated: 1315 pounds of silica; 2049 pounds of aluminum sulfate, and 411 pounds of carbonate of potash in addition to all of the carbonate of potash used as re-agent in the initial step of the process. These average results of the process, as carried on on a commercial scale, show that all ingredients of the potash-bearing mineral, and every chemical, employed in the decomposing process, are recovered without any material diminution and that they are obtained in the forms of commercially most desirable compounds. The products are substantially pure, that is of such a grade of purity as they are supposed to be, to be usuable for industrial purposes, or "commercially pure", the process being intended, and purposely devised, to obtain these products in such a grade of purity as required for their use in industrial arts.

I claim as my invention:

1. The process of decomposing potash-bearing silicious minerals comprising the following steps: (1) grinding the mineral, mixing it with a sufficient quantity of carbonate of potash, to convert all of the silica contained therein into potassium silicate, and fusing the mixture at a high temperature; (2) grinding the fused compound and then subjecting it to the action of a sufficient quantity of cold water to dissolve all of the aluminate of potash and of the oxid of potash; (3) drawing off the solution, adding thereto an alkali to make the solution safely alkaline and then enough of an ammonium salt to precipitate all alumina of the aluminate of potash as hydrated aluminum oxid, and then separating the liquor from the precipitated hydrated aluminum oxid; (4) charging the liquor with a sufficient quantity of carbonic acid to convert the oxid of potassium, held therein in solution, into carbonate of potash, and then evaporating the water; (5) recovering the potash from the in cold water insoluble residue; substantially as herein set forth.

2. The process of decomposing potash-bearing silicious minerals comprising the following steps: (1) grinding the mineral, mixing it with a sufficient quantity of carbonate of potash, to convert all of the silica contained therein into potassium silicate, and fusing the mixture at a high temperature; (2) grinding the fused compound and then subjecting it to the action of a sufficient quantity of cold water to dissolve all of the aluminate of potash and of the oxid of potash; (3) drawing off the solution, adding just enough ammonia to make it safely alkaline, then adding thereto enough of an ammonium salt to precipitate all alumina of aluminate of potash as hydrated aluminum oxid and then separating the liquor from the precipitated hydrated aluminum oxid; (4) charging the liquor with a sufficient quantity of carbonic acid to convert the oxid of potassium, held therein in solution, into carbonate of potash, and then evaporating the water; (5) recovering the potash from the in cold water insoluble residue; substantially as herein set forth.

THOMAS B. STILLMAN.

Witnesses:
JOHN H. HENSHAW,
VERONICA BRAUN.